A. BULLOCK.
TABULATOR FOR TYPE WRITERS.
APPLICATION FILED JAN. 24, 1912.
1,058,721.
Patented Apr. 15, 1913.
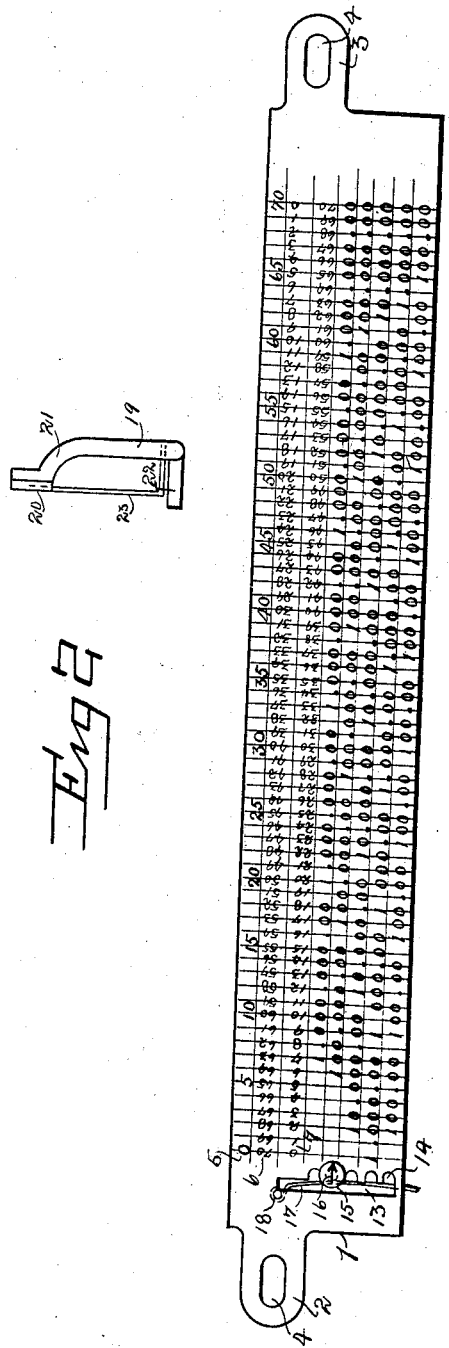
WITNESSES
INVENTOR
Alfred Bullock
BY
ATTORNEY

UNITED STATES PATENT OFFICE.

ALFRED BULLOCK, OF NEW YORK, N. Y.

TABULATOR FOR TYPE-WRITERS.

1,058,721.  Specification of Letters Patent.  Patented Apr. 15, 1913.

Application filed January 24, 1912. Serial No. 673,047.

*To all whom it may concern:*

Be it known that I, ALFRED BULLOCK, a citizen of the United States, and resident of the borough of Brooklyn, county of Kings, city and State of New York, have invented certain new and useful Improvements in Tabulators for Type-Writers, of which the following is a specification.

This device is intended for use with typewriters not provided with the more complicated and mechanical tabulating devices, and is constructed as a substitute scale to be applied in place of the ordinary scale usually provided to indicate the position of the carriage.

This tabulator does more than the ordinary mechanically operated device can do in that it tells at a glance the number of character spaces used, the number available for future use, the number of columns of figures of any denomination that may be placed upon a sheet, as well as the starting and finishing point of each column, and much other information not here set forth.

The details of the construction and operation of my device will appear as the specification progresses.

The following is what I consider the best means of carrying out this invention.

The accompanying drawings form a part of this specification, in which:

At Figure 1, I have shown a completed scale, and, Fig. 2 shows a modified form of pointer that may be used therewith.

Similar reference numerals indicate like parts in all the figures where they appear.

Referring to the drawing at 1, I have shown a plate upon which the scale and other characters are produced. This plate is provided with outwardly extending parts 2 and 3, each of which is provided with a perforation 4 arranged and adapted to accommodate screws by the means of which the scale is secured to the carriage of a typewriter. Each of the perforations 4 is somewhat elongated so as to allow the scale to be adjusted to the proper position before the screws are firmly secured. Adjacent to the upper edge of the plate 1, I have engraved a scale 5, subdivided into seventy equal parts and having each fifth part numerally indicated. Immediately below this scale I have arranged an additional series of numerals 6, advancing by units and in the reverse order from seventy to one. A short distance below the series of numerals 6 I have engraved a second series of numerals 7, advancing in units from 0 to seventy. Below this series of numerals 7 I have arranged five lines of figures, the first line 8, commences at space 7 and extends to the space 70 and sets forth five different times the characters for five columns of nine figures each with the proper decimal points and commas allowing a space between each column of figures. The second line 9, commences with the space 6 and extends to the space 70 and sets forth six columns of figures of eight characters each together with the proper points and spaces between each column. The third line sets forth seven columns of figures of seven characters each together with the proper points and spaces. The fourth column 11, sets forth eight columns of figures of six characters each together with the proper spaces and points, and the fifth and bottom line 12 sets forth 10 columns of figures of five characters each together with the proper points and spaces. Arranged along one side of the columns of figures is a slot 13 provided with a plurality of serrations or notches 14 and movable in this slot 13 is a button 15 provided with an indicating arrow 16. A bowed spring 17 secured by means of a pin 18 bears against the button 15 and holds it temporarily in any of the notches 14.

So that the figures on the numerous scales may be read with ease I have arranged a pointer 19, shown in Fig. 2, which may be substituted for the indicating pointer with which a typewriter is provided. This pointer 19, which is secured in the position of and by the means provided to secure the ordinary pointer is provided with a knife-edge or hairline 20 resting adjacent to the scale 5 and the pointer is slightly bowed immediately below the knife-edge as shown at 21, so that the supporting standard for the knife-edge will be away from the indicator of the printing line. A right angle projection 22 serves to allow this pointer to be secured to the machine by the ordinary means.

The operation of this device might be considered obvious from its construction but I will nevertheless describe it in detail. The scale 5 indicates the writing line and the number of spaces and the proper location of the characters is set forth on that scale. At 6, the number of spaces yet to be used is shown, in this scale the spaces are each numbered commencing from right to left and advancing by units. The scale 7 indicates the number of spaces numbering each one and advancing from left to right. The scale 8 shows that five columns of figures each setting forth one million or any number of seven places, each column having two places decimal, may be placed between 0 and 70. This scale also shows where each column should commence and end and where each point should be placed and each space allowed. The scale 9 shows that five columns of figures each of six places and two places decimal may be placed between 0 and 70. This scale also shows where each column should commence and end, and where each point should be placed and each space allowed. The scales 10, 11, and 12 accomplish the same useful results for 5, 4, and 3 places respectively and each is arranged to accommodate two places decimal. Scale 10 showing that seven columns of five places each and decimals may be placed between 0 and 70, scale 11 that eight columns of four places and decimals, and scale 12 that 10 columns of three places each and decimals may be arranged between 0 and 70 with sufficient allowance for spaces between the columns and points to divide the columns. If the operator be writing a series of figures based on the scale 8, the button 15 is placed so that the arrow 16 indicates this scale and it serves as a constant reminder in moving the carriage, that the pointer must be brought to the position necessary to bring each column in alinement. In this way the device serves as an ordinary tabulator except that there are no mechanical stops, the operator moving the carriage to the proper position by hand.

I have described this device and its operation in the way in which I have developed it and observed it, though I am sure that modifications may be made within the scope of the appended claims without departing from the principle or sacrificing the advantages of this invention.

Having carefully and fully described my invention what I claim and desire to secure by Letters Patent is:—

1. In combination with a typewriter a space indicator provided with a plurality of indices for each space, said indices arranged with their horizontal lines parallel but having their decimal columns staggered and a movable button for indicating any one of the parallel lines of indices as herein specified.

2. In combination with a typewriter of a substitute scale provided with a plurality of indices having parallel horizontal lines of figures and vertical columns the decimal portions of which are staggered from each other and a substitute pointer adapted to present a hair line upon said indices as specified.

Signed at New York city, in the county of New York and State of New York this 5 day of January 1912.

ALFRED BULLOCK.

Witnesses:
G. E. STERRITTE,
ARTHUR PHELPS MARR.

---

Copies of this patent may be obtained for five cents each, by addressing the "Commissioner of Patents, Washington, D. C."